(12) United States Patent
Barman et al.

(10) Patent No.: US 12,355,586 B2
(45) Date of Patent: Jul. 8, 2025

(54) SCALABLE VIRTUALIZED CONTROLLER AREA NETWORK SYSTEM

(71) Applicant: NXP B.V., Eindhoven (NL)

(72) Inventors: Arun Kumar Barman, Faridabad (IN); Pradeep Singh, Greater Noida West (IN); Rahul Agrawal, Vasundhra Enclave (IN); Devendra Bahadur Singh, Lucknow (IN); Robert Anthony McGowan, Cedar Park, TX (US)

(73) Assignee: NXP B.V., Eindhoven (NL)

( * ) Notice: Subject to any disclaimer, the term of this patent is extended or adjusted under 35 U.S.C. 154(b) by 142 days.

(21) Appl. No.: 18/305,430

(22) Filed: Apr. 24, 2023

(65) Prior Publication Data
US 2024/0297807 A1 Sep. 5, 2024

(30) Foreign Application Priority Data
Mar. 1, 2023 (IN) .............................. 202341013876

(51) Int. Cl.
*H04L 12/40* (2006.01)
(52) U.S. Cl.
CPC .. *H04L 12/40013* (2013.01); *H04L 12/40078* (2013.01); *H04L 2012/40215* (2013.01)
(58) Field of Classification Search
CPC ......... H04L 12/40013; H04L 12/40078; H04L 12/4641; H04L 2012/40215
(Continued)

(56) References Cited

U.S. PATENT DOCUMENTS 6,865,596 B1 * 3/2005 Barber .................... H04L 67/00
709/208
8,141,094 B2 3/2012 Brown et al.
(Continued)

FOREIGN PATENT DOCUMENTS

| CN | 106789487 A | 5/2017 |
| CN | 111404793 A | 7/2020 |
| JP | 5756191 B2 | 7/2015 |

OTHER PUBLICATIONS

C. Herber, A. Richter, T. Wild and A. Herkersdorf, "A network virtualization approach for performance isolation in controller area network (CAN)," 2014 IEEE 19th Real-Time and Embedded Technology and Applications Symposium (RTAS), Berlin, Germany, 2014, pp. 215-224, doi: 10.1109/RTAS.2014.6926004. (Year: 2014).*

(Continued)

*Primary Examiner* — Eric T Oberly (57) ABSTRACT

A virtualized controller area network (CAN) system including multiple virtual CAN controllers and a CAN virtual network controller. The CAN virtual network controller includes virtual CAN interfaces, network interfaces, and a configuration controller. Each of the virtual CAN interfaces communicatively links each virtual CAN controller with the network interfaces, which are each configured to communicatively link one or more of virtual CAN controllers into a CAN network. The configuration controller programs any one or more of the network interfaces to communicatively link any one or more of the virtual CAN controllers in each of one or more CAN networks. The configuration controller configures a network interface for virtual communications for implementing a virtual CAN network, or enables a linked physical protocol engine for implementing a physical CAN network. The number of protocol engines needed, if any, may be significantly reduced thereby reducing pin count and silicon area consumption.

19 Claims, 5 Drawing Sheets

(58) Field of Classification Search
USPC ...... 709/227, 229; 710/305, 316, 317; 718/1
See application file for complete search history.

(56) References Cited

U.S. PATENT DOCUMENTS

| | | |
|---|---|---|
| 10,103,901 B2 | 10/2018 | Wu et al. |
| 11,196,585 B1 | 12/2021 | Auerbach et al. |
| 2003/0110173 A1 | 6/2003 | Marsland |
| 2013/0227648 A1* | 8/2013 | Ricci ............... H04W 12/088 |
| | | 726/3 |
| 2016/0366253 A1* | 12/2016 | Lu .................... H04L 69/161 |
| 2021/0306177 A1 | 9/2021 | Fredriksson |
| 2022/0321378 A1* | 10/2022 | Auerbach ......... H04L 12/40052 |
| 2024/0195756 A1* | 6/2024 | Fallon ............... H04L 49/101 |

OTHER PUBLICATIONS

A. Wasicek, O. Höftberger, M. Elshuber, H. Isakovic and A. Fleck, "Virtual CAN Lines in an Integrated MPSoC Architecture," 2014 IEEE 17th International Symposium on Object/Component/Service-Oriented Real-Time Distributed Computing, Reno, NV, USA, 2014, pp. 158-165, doi: 10.1109/ISORC.2014.34. (Year: 2014).*

* cited by examiner

SCALABLE VIRTUALIZED CONTROLLER AREA NETWORK SYSTEM

CROSS-REFERENCE TO RELATED APPLICATIONS

This application claims the priority under 35 U.S.C. § 119 of India patent application No. 202341013876, filed on 1 Mar. 2023, the contents of which are incorporated by reference herein.

BACKGROUND

Field of the Disclosure

The present invention relates in general to controller area networks, and more particularly to a scalable virtualized controller area network system.

Description of the Related Art

Recent demand of multiple applications on a single chip in different applications and in various domains, such as, for example, automotive and industrial applications, have dramatically increased the number of controller area network (CAN) interfaces on a chip. This demand has led to an increase in number of pins and CAN controllers causing crunch in chip pins and silicon area. Moreover, many of these applications share common CAN networks with other applications on the same chip which makes many pins and controllers functionally redundant causing a waste of silicon area and pins. In addition, removing CAN controllers may not be feasible since this negatively impacts software compatibility.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION OF EMBODIMENTS

A scalable virtualized controller area network system as described herein replaces conventional controller area network (CAN) controllers with virtual CAN controllers and breaks the conventional integral link between each CAN controller and corresponding physical protocol engines. Instead, a CAN virtual network controller (CVNC) is interposed between the virtual CAN controllers and one or more physical protocol engines to enable scalability and greater CAN network flexibility including dynamic CAN network configuration and reconfiguration. The scalable virtualized controller area network system as described herein provides configurable mapping and dynamic remapping of the virtual CAN controllers and physical protocol engines. The scalable virtualized controller area network system as described herein enables the configuration of purely virtual CAN networks between selected virtual CAN controllers without the limitations of physical CAN networks. Virtual CAN networks, for example, operate substantially faster and without the conventional physical layer errors. Even with the added capabilities, the scalable virtualized controller area network system as described herein provides backward compatibility with software thereby reducing and even eliminating host software rewrite or upgrades.

Figure 1:
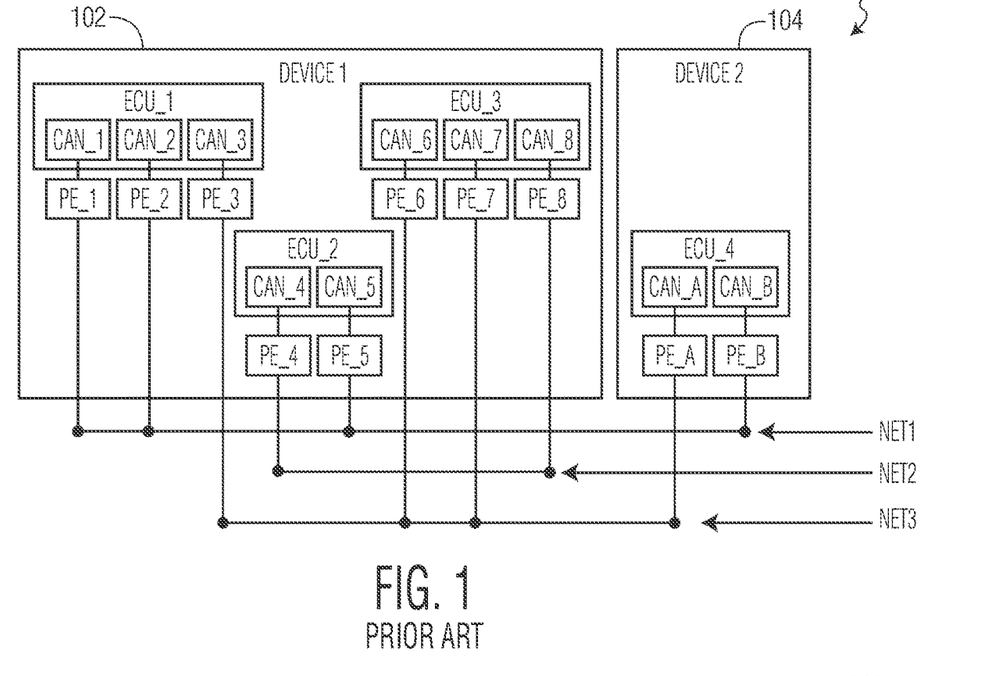
FIG. 1 is a simplified block diagram of a controller area network (CAN) system implemented according to a conventional configuration.

FIG. 1 is a simplified block diagram of a CAN system 100 implemented according to a conventional configuration. The conventional CAN system 100 includes a first CAN device 102 and a second CAN device 104 communicatively coupled to one or more of three external physical CAN networks labeled NET1, NET2, and NET3. The first CAN device 102 is used to implement a first electronic control unit (ECU) ECU_1, a second electronic control unit ECU_2 and a third electronic control unit ECU_3. ECU_1 of the first CAN device 102 includes three physical CAN controllers CAN_1, CAN_2, and CAN_3 that are integrally linked with a corresponding three physical protocol engines (PEs) PE_1, PE_2, and PE_3, respectively. ECU_2 of the first CAN device 102 includes two physical CAN controllers CAN_4 and CAN_5 that are integrally linked with a corresponding two physical protocol engines PE_4 and PE_5, respectively. In addition, ECU_3 of the first CAN device 102 includes three physical CAN controllers CAN_6, CAN_7, and CAN_8 that are integrally linked with a corresponding three physical protocol engines PE_6, PE_7, and PE_8, respectively.

The second CAN device 104 implements a fourth electronic control unit ECU_4 which includes two physical CAN controllers CAN_A and CAN_B that are integrally linked with a corresponding two physical protocol engines PE_A and PE_B, respectively. PE_1, PE_2, and PE_5 of the first CAN device 102 and PE_B of the second CAN device 104 are coupled to the external physical CAN network NET1. PE_4 and PE_8 of the first CAN device 102 are coupled to the external physical CAN network NET2. PE_3, PE_6, and PE_7 of the first CAN device 102 and PE_A of the second CAN device 104 are coupled to the external physical CAN network NET3.

Each ECU performs a separate function of the system depending upon the application or type of system. In an automotive application, for example, a first ECU may function as an engine control module, another ECU may perform braking functions, another ECU may perform lighting functions, another ECU may perform radar vision functions, and so on. Although the ECUs may perform different functions, they are often implemented to communicate with each other via one or more networks. Each CAN implements a shared bus for establishing communications in which the CAN controllers (e.g., CAN_1, CAN_2, etc.) communicate with each other on an external physical network (e.g., NET1, NET2, etc.) via a physical protocol engine (e.g., PE_1, PE_2, etc.). Each of the physical networks may be implemented as a differential pair of conductors in which each protocol engine transforms communication between the CAN controllers into the physical (PHY) communication operations on the networks.

As application and corresponding functions become more complex, the number of CAN controllers and corresponding protocol engines on each device or semiconductor chip or integrated circuit (IC) have increased, which has led to a concomitant increase in the number of pins and silicon area consumption. As illustrated by the first CAN device 102, each CAN controller requires a separate physical protocol engine to enable CAN communications therewith, and each protocol engine increases pin count of the chip. Although improvements have been made to increase the speed of the physical CAN networks, they operate at dramatically reduced speeds as compared to on-chip circuitry communications. Although the circuitry of the CAN controllers CAN_4 and CAN_8 might otherwise operate at substantially higher clock rates as compared to the physical networks, the communications between ECU_2 and ECU_3 on the first CAN device 102 are limited by the significantly slower speed of the physical network NET2. In addition, the slower external physical CAN networks are more prone to errors due to environmental conditions.

Figure 2:
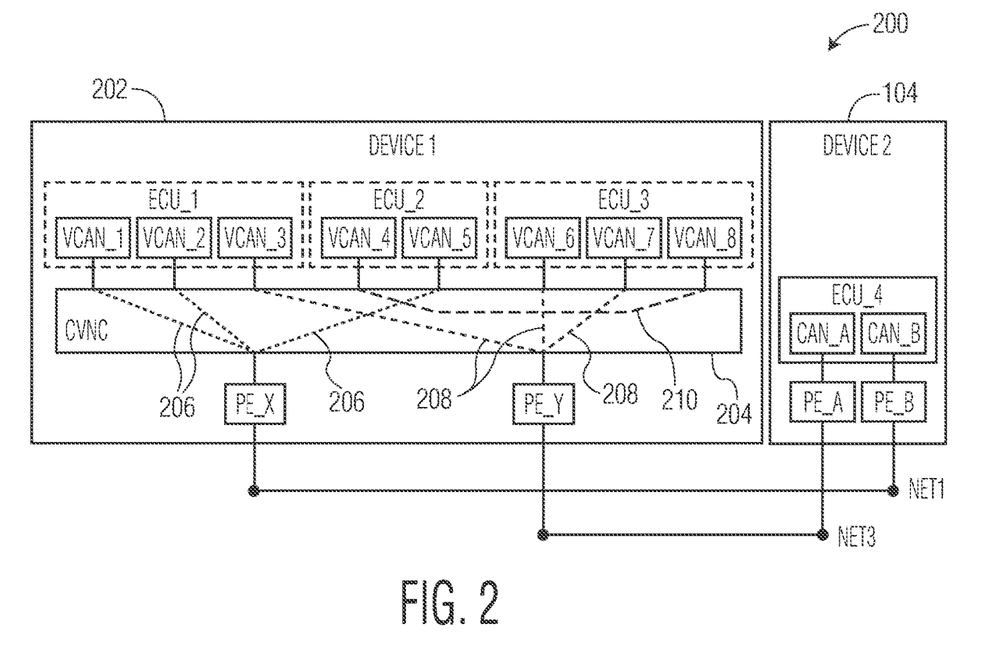
FIG. 2 is a simplified block diagram of a CAN system including virtualized CAN (VCAN) device implemented according to one embodiment of the present disclosure.

FIG. 2 is a simplified block diagram of a CAN system 200 including virtualized CAN (VCAN) device 202 implemented according to one embodiment of the present disclosure. The CAN system 200 may be configured to establish the same communication networks NET1-NET3 as the CAN system 100 in which the VCAN device 202 replaces the first CAN device 102. The second CAN device 104 remains unmodified. The VCAN device 202 implements similar electronic control units ECU_1, ECU_2, and ECU_3 of the first CAN device 102, except that each ECU is configured using virtual CAN (VCAN) controllers. ECU_1 of the VCAN device 202 includes three virtual CAN controllers VCAN_1, VCAN_2, and VCAN_3 that replace the physical controllers CAN_1. CAN_2, and CAN_3, respectively. ECU_2 of the VCAN device 202 includes two virtual CAN controllers VCAN_4 and VCAN_5 that replace the physical controllers CAN_4 and CAN_5, respectively. In addition, ECU_3 of the VCAN device 202 includes three virtual CAN controllers VCAN_6, VCAN_7, and VCAN_8 that replace the physical controllers CAN_6, CAN_7, and CAN_8, respectively. The second CAN device 104 implementing ECU_4 remains unmodified.

The conventional link between each CAN controller and protocol engine is eliminated and replaced by a CAN virtual network controller (CVNC) 204. Each of the VCANs VCAN_1-VCAN_8 are communicatively coupled to communicate with the CVNC 204 as further described herein. The PE devices PE_1-PE_8 are replaced by physical protocol engines PE_X and PE_Y, which are configured to communicate on the external physical networks NET1 and NET3 in substantially similar manner as the PE devices PE_1-PE_8 of the CAN system 100. PE_X and PE_Y, however, are not tied to any particular CAN controller but are instead configured to communicate with any of the virtual CAN controllers VCAN_1-VCAN_8 via the CVNC 204. In this manner, the virtual CAN controllers VCAN_1-VCAN_8 may instead be configured to share PE_X and PE_Y as further described herein.

First dashed lines 206 drawn within the CVNC 204 illustrate that VCAN_1, VCAN_2, and VCAN_5 are communicatively linked with protocol engine PE_X for communicating via the external physical communication network NET1. In a similar manner, second dashed lines 208 drawn within the CVNC 204 illustrate that VCAN_3, VCAN_6, and VCAN_7 are communicatively linked with protocol engine PE_Y for communicating via the external physical communication network NET3. As described for the first CAN device 102, the controllers CAN_4 and CAN_8 were required to communicate on another external physical network, namely NET2. The CVNC 204 of the VCAN device 202, however, may be configured to establish a virtualized network illustrated by a third dashed line 210, which enables more direct and significantly faster communication between the virtual CAN controllers VCAN_4 and VCAN_8. Thus, the extraneous external physical network NET2 may be eliminated thereby further reducing the number of protocol engines.

In summary, the VCAN device 202 may be used to establish the same CAN networks with a substantially reduced number of physical protocol engines, which reduces silicon area and which dramatically reduces the number of chip pins. The CVNC 204 may be configured to link multiple virtual CAN controllers with a protocol engine to establish essentially the same external physical networks as in the conventional configuration. In addition, the CVNC 204 enables on-chip virtual networks that operate substantially faster without errors or with minimal errors as compared to the external physical networks. In one embodiment, for example, each virtual network 210 operates at a rate that may be greater than 200 times that of the external physical networks for a dramatic increase in efficiency and performance. The virtual on-chip networks may be implemented independent of signaling restrictions that would otherwise be enforced by external physical networks.

In addition, as further described herein, each virtual CAN controller (or simply. VCAN) may be dynamically assigned or re-assigned to any physical or virtual network during operation. Furthermore, each protocol engine PE_X and PE_Y may also be dynamically enabled or disabled during operation as further described herein. Scalability and dynamic configuration and reconfiguration enable additional functionality and flexibility not available in conventional configurations. For example, an extra or spare VCAN may be provided and dynamically coupled to any of the existing networks on the VCAN device 202 for purposes of diagnostics, security, functional upgrades (such as for subscription-based applications), etc.

Figure 3:
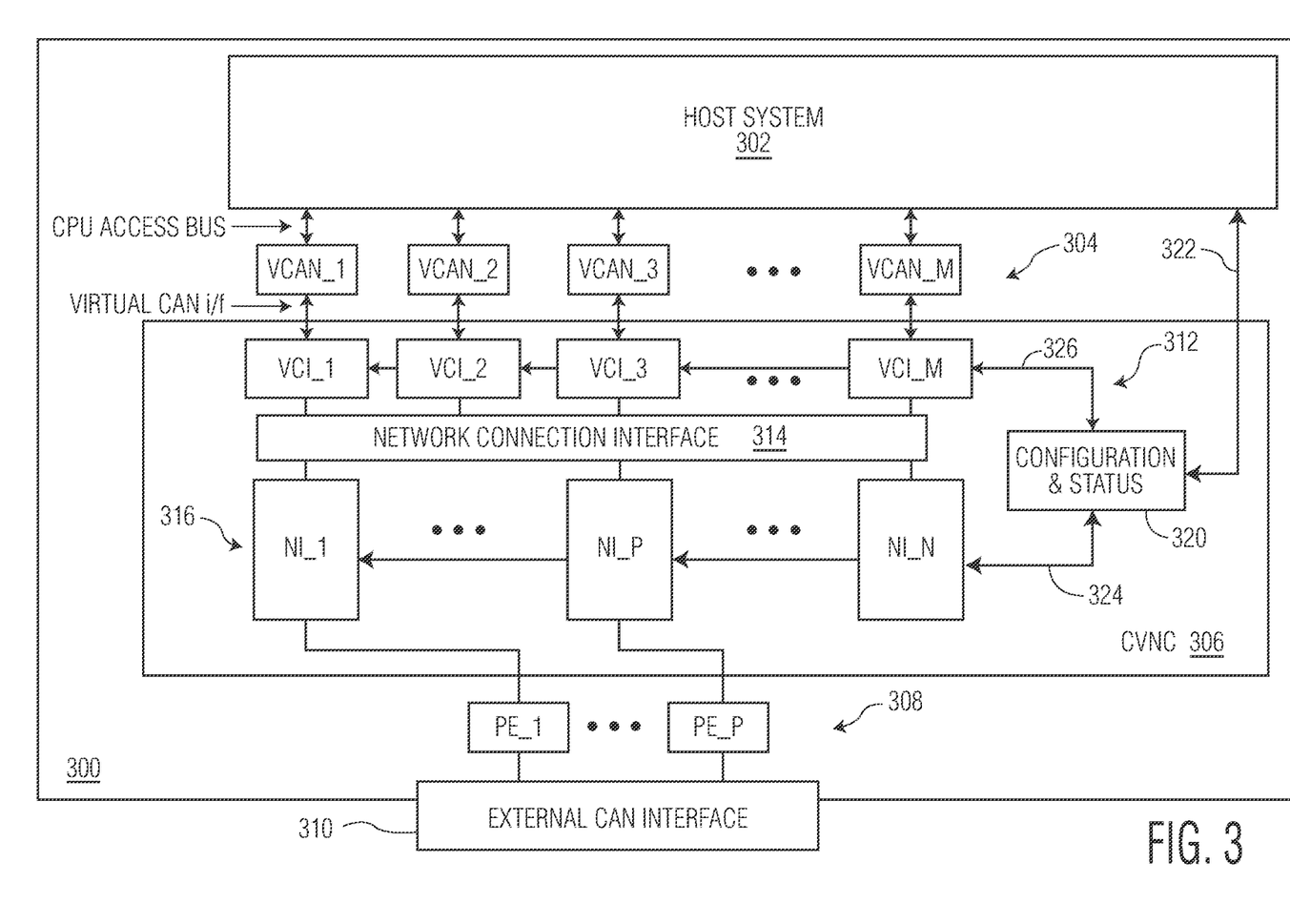
FIG. 3 is a block diagram of a VCAN device illustrating a configuration of the VCAN device of FIG. 2 according to one embodiment.

FIG. 3 is a block diagram of a VCAN device 300 illustrating a configuration of the VCAN device 202 according to one embodiment. The VCAN device 300 includes a host system 302, an integer number "M" of virtual CAN controllers or VCANs 304, individually labeled VCAN_1. VCAN_2, VCAN_3, . . . , VCAN_M, a CAN virtual network controller (CVNC) 306, an integer number "P" of protocol engines 308, individually labeled PE_1, . . . , PE_P, and an external CAN interface 310. The host system 302 may include any type of processing device and support functions, such as a central processing unit (CPU) or the like coupled to memory (not shown) and a host bus (not shown) for interfacing each of the VCANs 304. The host system 302 generally performs configuration and reconfiguration functions for setting up CAN networks, revising or updating CAN networks, status monitoring of the network configuration and communications, and for performing CAN communications using one or more of the VCANs 304.

The number M of VCANs 304 included for a given configuration of the VCAN device 300 depends upon intended application or may be determined to meet the needs of many or most CAN configurations. Additional VCANs may be included when additional or upgraded functions or the like may be desired or possible for a given implementation. The protocol engines 308 perform external CAN communications on corresponding CAN networks via the external CAN interface 310, such as, for example, NET1 and NET3 of FIG. 2. The number P of protocol engines 308 included for a given configuration of the VCAN device 300 is selected to implement a suitable number of external physical CAN networks for a given implementation, in which M is greater than or equal to P. It is noted that the number P may be substantially smaller than the number of CANS and protocol engines of conventional configurations. As previously described, for example, the VCAN device 202 only needs two protocol engines for interfacing two external physical CAN networks for as compared to eight protocol engines required by the first CAN device 102 of a conventional configuration.

The CVNC 306 includes M virtual CAN communication interfaces (VCI) 312, individually labeled VCI_1 to VCI_M, which includes one VCI interface for each of the VCANs 304. The CVNC 306 also includes a network connection interface 314, a number "N" of network interfaces (NI) 316, individually labeled NI_1, . . . , NI_P, . . . , NI_N, and a configuration & status module 320. The number N of network interfaces 316 is greater than or equal to P, which is the number of protocol engines 308. Each of the P protocol engines 308 is integrally linked to a corresponding one of P network interfaces, in which additional network interfaces 316 (e.g., NI_P+1, . . . , NI_N) may be included for implementing additional virtual networks as further described herein.

A set of control & status signals 322 may be provided between the host system 302 and the configuration & status module 320 for configurating the CVNC 306 and for monitoring status and network operation. Another set of control & status signals 324 may be provided between the configuration & status module 320 and each of the network interfaces 316. In addition, another set of control & status signals 326 may be provided between the configuration & status module 320 and each of the VCI interfaces 312. The set of control & status signals 322 enables the host system 302 to configure and reconfigure, as desired, the CVNC 306 via the configuration & status module 320 to establish the virtual or physical CAN networks and to monitor operation thereof. As described further herein, the host system 302 may dynamically modify the network configurations. The set of control & status signals 324 and 326 enables the configuration & status module 320 to configure the VCI interfaces 312 and the network interfaces 316 to establish and monitor the virtual or physical CAN networks in accordance with the control parameters determined by the host system 302.

The host system 302 accesses the configuration & status module 320 to establish a CAN network between one or more of the VCANs 304 with each of one or more network interfaces 316. If the CAN network does not need an external physical communication network, then the corresponding network interface 316 is programmed to establish a virtual CAN network. If instead the CAN network requires a corresponding physical network using one of the protocol engines 308, then the host system 302 accesses the configuration & status module 320 to establish a communication link between one of the P network interfaces 316 that is linked to protocol engine 308, and further enables the corresponding protocol engine. As described further herein, each of the network interfaces 316 may be configured as a virtual network for conducting CAN communications or as a physical network for conducting physical CAN communications. Once the VCAN device 300 is configured, the host system 302 conducts CAN communications using linked ones of the VCANs 304.

Each of the VCANs 304 is configured to communicate with the host system 302 in substantially the same manner as conventional CAN controllers. In addition, each of the protocol engines PE_1-PE_P is configured to conduct CAN communications on external CAN physical networks (e.g., NET1, NET3) in substantially the same manner as conventional protocol engines. In this manner, once the configuration of the VCAN device 300 is established by the host system 302, CAN communications may be conducted in substantially the same manner as conventional configurations. This provides backwards compatibility of CAN software or applications. With reference to FIGS. 1 and 2, for example, the same CAN communication software used by the first CAN device 102 may be configured to be executed by the host system 302 without modification. This is true for virtual networks as well. For example, the same CAN communication software executed by the host system 302 establishing communications between VCAN_4 and VCAN_8 via virtual network 210 may be the same as that used by the first CAN device 102, although communication transactions between VCAN_4 and VCAN_8 occur at a much higher rate.

The connectivity mapping of the VCANs 304 and corresponding transceivers 304 with the network interfaces 316 is entirely scalable and flexible. The connectivity mapping of the protocol engines 308 with the network interfaces 316 is fixed in which each of the protocol engines 308 may be enable or disabled. With reference to FIGS. 2 and 3, any of the VCANs 304 may be used to operate as VCAN_1 of the VCAN device 202, and remaining ones of the VCANs 304 may be used to operate as VCAN_2 of the VCAN device 202, and so on. In addition, the VCANs 304 may be allocated or swapped as necessary or desired, and the protocol engines 308 may be enabled or disabled as necessary or desired. For example, if a selected VCAN 304 is detected by the CPU 302 as malfunctioning, so long as an extra unused VCAN 304 is available, the extra VCAN 304 may be dynamically linked in as a replacement.

Independent dynamic switching (enabling, disabling) of the VCANs 304 not only provides flexibility, but enables additional functionality not available with conventional configurations that may be enabled and activated at any time. As an example, an extra unused VCAN 304 may be added to any of the existing CAN networks to add security or diagnostic capability. The added VCAN may be enabled and activated to perform the desired operations and then disconnected or disabled when the additional operations are completed. Spare or standby VCANs 304 may also be used to dynamically enable upgrades, add features, provide additional security or diagnostics, etc. The CAN network topology may be dynamically modified during operation without re-booting the device or even the overall CAN system.

The VCAN device 300 enables dynamic allocation and mapping of virtual networks between selected ones of the VCANs 304. Two or more VCANs 304 may be linked to a network interface 316 configured for virtual networking without linking a protocol engine. If the network interface includes a protocol engine, the protocol engine may simply be disabled and the network interface programmed for virtual communications. As an example, a first VCAN may be added to a first ECU and a second VCAN may be added to a second ECU and the first and second VCANs may be linked to a network interface to establish an additional virtual network communication path between the first and second ECUs.

Figure 4:
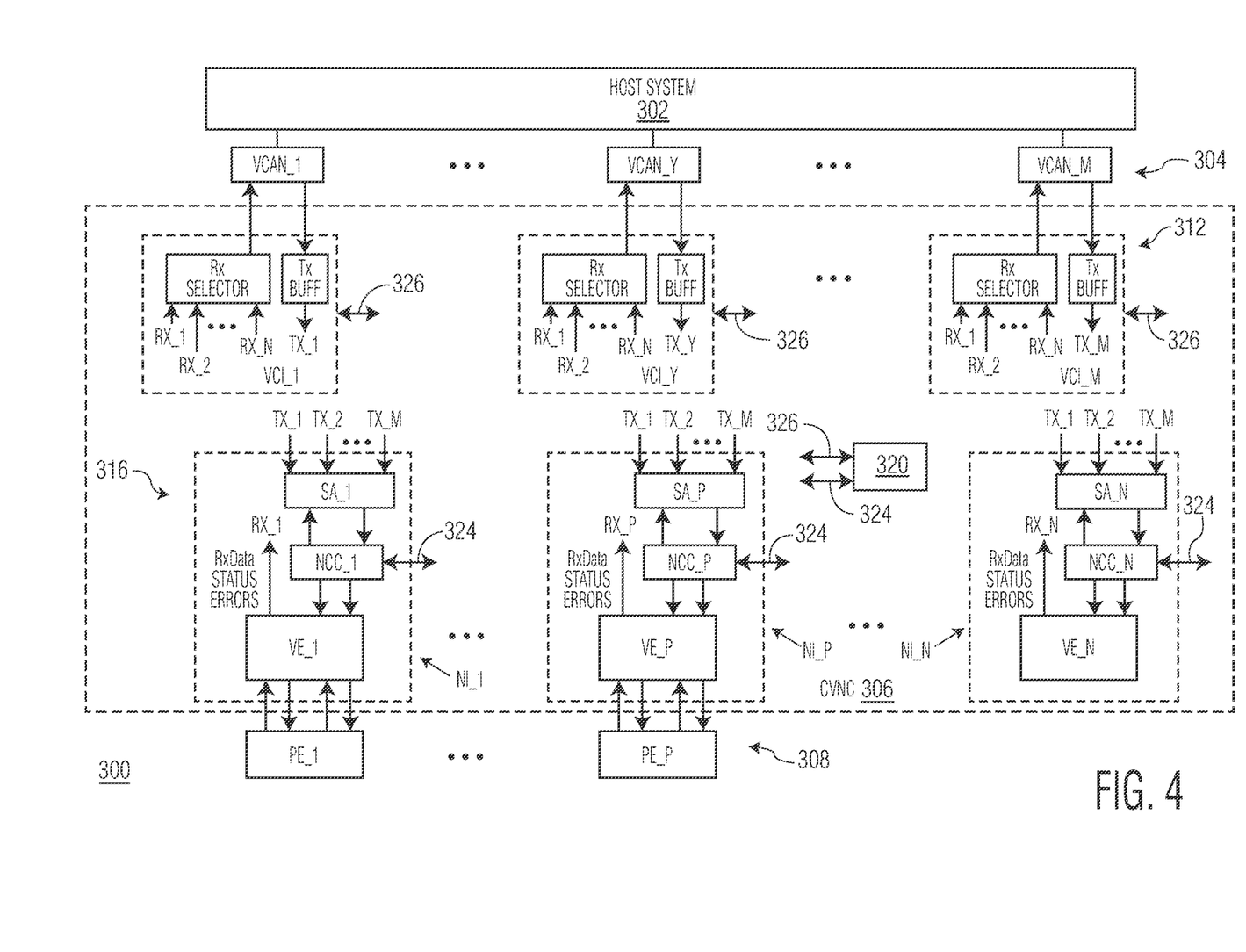
FIG. 4 is another block diagram of the VCAN device of FIG. 3 illustrating further details of the CAN virtual network controller of FIG. 3 according to one embodiment.

FIG. 4 is another block diagram of the VCAN device 300 illustrating further details of the CVNC 306 according to one embodiment. The first, an intermediate, and the last one of the M VCANs 304, individually labeled VCAN_1, VCAN_Y, and VCAN_M, respectively, are shown interfacing the host system 302. The first, an intermediate, and the last one of the M VCI interfaces 312, individually labeled VCI_1, VCI_Y, and VCI_M, respectively, are shown, each communicatively interfacing VCAN_1, VCAN_Y, and VCAN_M, respectively. Each of the VCI interfaces 312 includes a receive (RX) selector and a transmit (TX) buffer. In addition, the first, an intermediate, and the last one of the N network interfaces 316, individually labeled NI_1, NI_P, and NI_N, respectively, are shown.

Each of the network interfaces 316 includes a scalable arbiter, a network connection controller (NCC), and a virtual engine (VE). As shown in FIG. 3, for example, the first network interface NI_1 includes a scalable arbiter SA_1, a network connection controller NCC_1, and a virtual engine VE_1, the intermediate network interface NI_P includes a scalable arbiter SA_P, a network connection controller NCC_P, and a virtual engine VE_P, and the last network interface NI_N includes a scalable arbiter SA_N, a network connection controller NCC_N, and a virtual engine VE_N.

Each of the N network interfaces 316 is coupled to a corresponding one of N receive buses, individually labeled RX_1, . . . , RX_P, . . . , RX_N, which includes an intermediate receive bus RX_P, in which the receive buses are further coupled to respective inputs of each RX selector of each of the VCI interfaces 312. It is noted that each of the receive buses RX_1-RX_N may include status signals or error signals and the like. The TX buffer of each of the VCI interfaces 312 is coupled to a corresponding one of M transmit buses, individually labeled TX_1, TX_2, . . . TX_M, which includes an intermediate transmit bus TX_Y. The transmit buses TX_1-TX_M are coupled to respective inputs of each of the scalable arbiters SA_1-SA_N of the network interfaces 316. The receive and transmit buses effectively form the network connection interface 314 between the VCI interfaces 312 and the network interfaces 316.

The configuration & status module 320 selects and links one or more of the VCANs 304 to one of the network interfaces 316 by programming the corresponding NCC of the network interface 316 via the control & status signals 324 and by programming each of the VCI interfaces 312 of the selected VCANs 304 via the control & status signals 326. When one or more VCANs 304 are linked to a network interface 316, the NCC of that network interface programs the corresponding scalable arbiter to detect transmit signals of the corresponding transmit buses of the linked VCANs 304. For example, if VCAN_1 and VCAN_Y are linked to network interface NI_1, then NCC_1 controls SA_1 to detect transmit signals on the transmit buses TX_1 and TX_Y. Transmit signals of transmit buses of other VCANs 304 not linked are masked or ignored. Similarly, the configuration & status module 320 programs the RX selectors of each of the VCI interfaces 312 of the linked VCANs 304 to detect receive signals of receive buses of the linked corresponding network interface 316 and to ignore or mask the other receive signals. For example, if only VCAN_1 and VCAN_Y are linked to network interface NI_1, then the RX selector of the CAN transceivers VCI_1 and VCI_Y to detect receive signals on receive bus RX_1 and to ignore the remaining receive buses RX_2 to RX_N.

In order to establish a physical network, the configuration & status module 320 enables one of the protocol engines 308 that is linked to one of the network interfaces 316 by programming the corresponding NCC of the network interface 316 via the control & status signals 324. The corresponding NCC configures the corresponding virtual engine VE_1-VE_N to enable the linked protocol engine to perform physical CAN communications on the corresponding CAN physical network. With reference to FIG. 2, for example, the configuration & status module of the VCAN device 202 links VCAN_1, VCAN_2, and VCAN_5 to a network interface within the CVNC 204, and further enables the protocol engine PE_X that is linked to that network interface to communication on the physical CAN network NET1.

The configuration & status module 320 may establish a virtual network by programming the corresponding NCC of the network interface 316 via the control & status signals 324. The corresponding NCC configures the corresponding virtual engine to perform communications according to virtual networking without using any of the protocol engines 308. If a network interface 316 is linked to a PE 308, then that PE is disabled. With reference to FIG. 2, for example, the configuration & status module of the VCAN device 202 links VCAN_4 and VCAN_8 to a network interface within the CVNC 204, and further configures the virtual engine of that network interface for virtual network communications between the linked VCANs VCAN_4 and VCAN_8.

In operation as further described herein, transmit data provided by a VCAN is provided through the corresponding TX buffer to the corresponding virtual engine via the scalable arbiter and NCC. For physical networks in which the network interface is linked to a protocol engine, the transmit data is provided to the linked protocol engine and asserted on the linked physical CAN network. For virtual networks in which the network interface is not linked to a protocol engine, the transmit data is looped back from the virtual engine to the RX selector of each linked VCAN.

Figure 5:
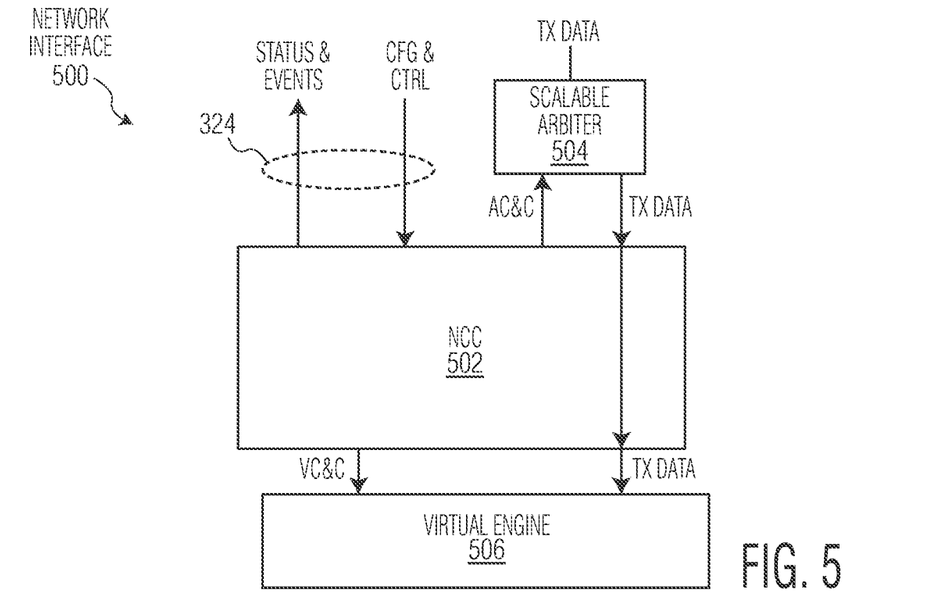
FIG. 5 is a more detailed block diagram of a network interface implemented according to one embodiment.

FIG. 5 is a more detailed block diagram of a network interface 500 implemented according to one embodiment. The network interface 500 may represent any one or more of the network interfaces NI_1-NI_N of the VCAN device 300. The network interface 500 includes an NCC 502 representing any one or more of the network connection controllers NCC_1-NCC_N, a scalable arbiter 504 representing any one or more of the scalable arbiters SA_1-SA_N, and a virtual engine 506 representing any one or more of the virtual engines VE_1-VE_N. The NCC 502 may include a control module (not shown) or may be implemented as a finite state machine (FSM) or the like. The set of control & status signals 324 includes configuration and control (CFG & CTRL) signals provided to the NCC 502 from the configuration & status module 320 for configuration of the network interface 500 and for providing any additional control functions. The set of control & status signals 324 also includes status & events signals provided from the NCC 502 for reporting status and other information to the configuration & status module 320, which may be forwarded to the host system 302. The NCC 502 correspondingly configures the scalable arbiter 504 via AC&C signals and configures the virtual engine 506 via VC&C signals. TX data received by the scalable arbiter 504 is provided to the virtual engine 506 either directly or through the NCC 502. The NCC 502, for example, may provide buffering or synchronization circuitry for the TX data.

In general, the NCC 502 generates and propagates configuration information to other modules, transfers and applies configuration changes at appropriate times, controls switching of the VCANs 304 from one network to another (or simply links or disconnects a VCAN from a network controlled by the network interface 500), controls configuration and reconfiguration (if applicable) of the network between physical and virtual types as controlled by the configuration & status module 320 and the host system 302, controls the virtual engine 506 to enable or disable a linked protocol engine, if any, configures CAN bit time for a virtual network if applicable, updates the status of VCANs and the network, among other functions.

Figure 6:
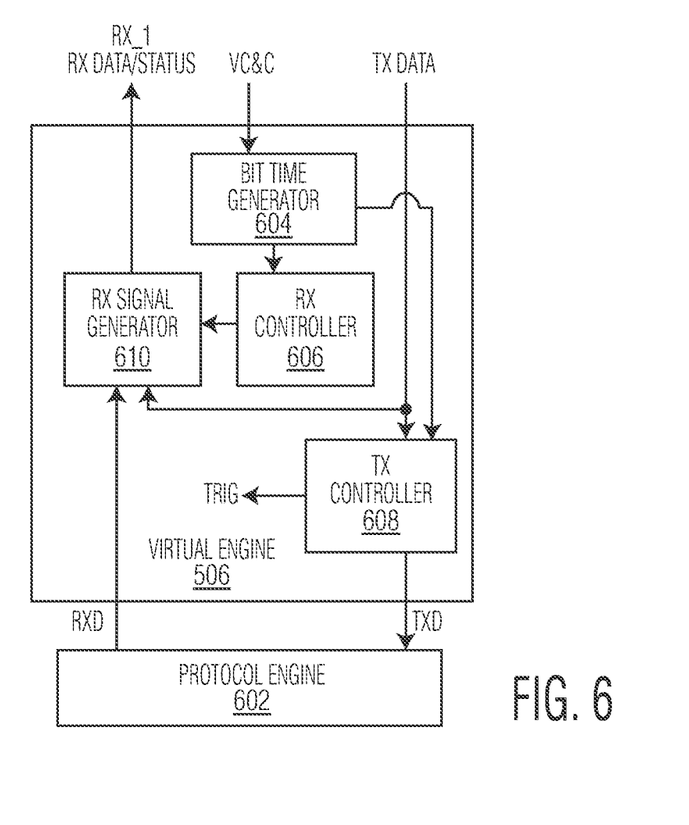
FIG. 6 is a more detailed block diagram of the virtual engine of FIG. 5 coupled to a protocol engine according to one embodiment.

FIG. 6 is a more detailed block diagram of the virtual engine 506 communicatively linked to a protocol engine 602 according to one embodiment. As noted above, the virtual engine 506 may represent any of the P virtual engines VE_1-VE_P linked to a protocol engine and the protocol engine 602 may represent any of the P protocol engines 308. The virtual engine 506 includes a bit time generator 604, a receive controller 606, a transmit controller 608, and a receive signal generator 610. Network interfaces that are not linked to a protocol engine are substantially the same but without the protocol engine 602. The virtual engine 506 generally controls communication between linked ones of the VCANs 304 and communication with an external physical CAN network with an enabled protocol engine 308.

The bit time generator 604 generally configures virtual network timing performed by the receive controller 606 and the transmit controller 608 when configured for virtual networking. The bit time generator 604 receives the VC&C signals for configuration, and generates bit time pulses as per protocol or as per user-defined bit timing for a virtual network depending upon how configured. In one embodiment, every pulse may be one CAN bit time.

The receive controller 606 controls receive data flow for physical and virtual networks as per bit CAN timing. The receive controller 606 adapts the data format of each frame according to virtual network communication protocols. The receive controller 606 controls push for a receive first-in, first-out (FIFO) buffer (not shown) in VCAN and pop for a transmit buffer (not shown) for virtual networks. The receive controller 606 provides receive status and error information ultimately provided to the linked VCANs 304.

The transmit controller 608 generally controls transmit data flow between the scalable arbiter 504 and the protocol engine 602 including providing transmit status information. The transmit controller 608 controls transmit data flow from the scalable arbiter (TX Data) to the protocol engine 602 (TXD) and generates pop for the transmit buffer. The transmit controller 608 provides transmit status information to the linked VCANs 304. The transmit controller 608 also asserts a trigger command TRIG to trigger the scalable arbiter 504 to conduct a local arbitration process as further described herein.

The receive signal generator 610 generally translates received data based on configuration information from the receive controller 606 and provides translated data to a corresponding virtual CAN interface via a corresponding receive bus. The receive signal generator 610 receives data (RXD) from the protocol engine 602 and provides receive data on the RX_1 bus to the RX Selector of the corresponding VCI interface 312. The receive signal generator 610 also generates necessary receive signaling for receive communications, including multiplexing signals from the protocol engine 602 and the RX controller 606 on the RX_1 bus.

Figure 7:
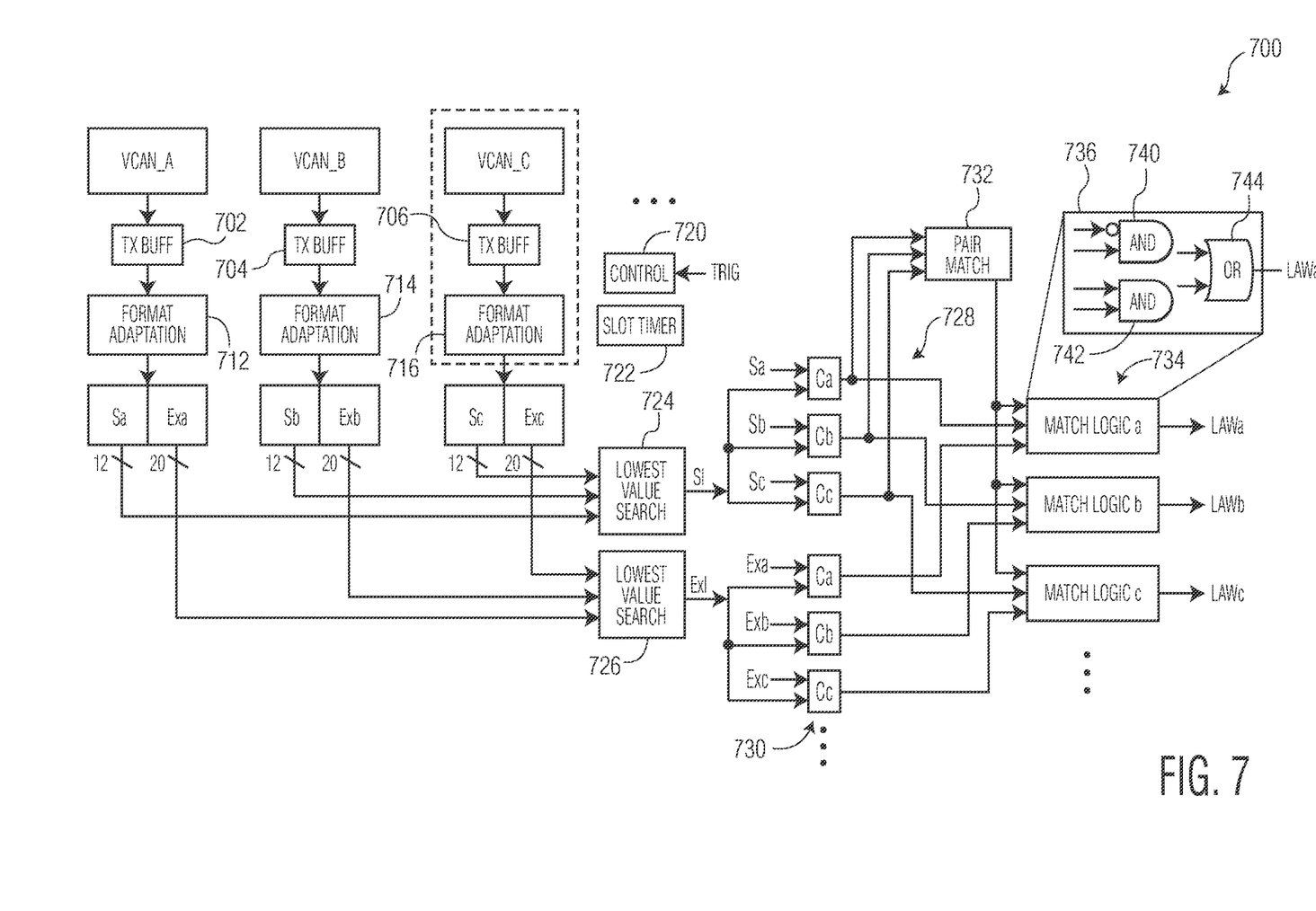
FIG. 7 is a generalized block diagram of a scalable arbiter representing any one or more of the scalable arbiters of the VCAN device of FIG. 3 for performing a scalable local arbitration process according to one embodiment.

FIG. 7 is a generalized block diagram of a scalable arbiter 700 representing any one or more of the scalable arbiters SA_1-SA_N of the VCAN device 300 for performing a local arbitration process according to one embodiment. The scalable arbiter 700 provides local arbitration among any of the VCANs 304 participating in a given network communicatively linked to one of the network interfaces 316. In one embodiment, the local arbitration process may be performed generally according to the conventional CAN protocol specification. Three of the VCANs 304 of the VCAN device 300 are shown, labeled VCAN_A, VCAN_B, and VCAN_C, which have been linked to a common network for arbitration. It is noted, however, that any number of VCANs 304 may be included for local arbitration. One or more of the VCANs VCAN_A, VCAN_B, and VCAN_C provide transmit information through transmit buffers 702, 704, and 706, respectively, of corresponding ones of the VCI interfaces 312 to corresponding format adaptation blocks 712, 714, and 716, respectively, of the corresponding scalable arbiter. An arbiter controller 720 starts the arbitration process upon receiving the first word of a transmit frame from one or more of the VCANs VCAN_A, VCAN_B, and VCAN_C and assertion of the trigger command TRIG. Each of the format adaptation blocks 712, 714, and 716 extracts and arranges fields in the appropriate format for arbitration and provides standard information and extended information per frame type, protocol, etc.

In one embodiment, for example, the extracted fields include an 11-bit standard identifier (ID), and 18-bit extended ID, a 1-bit RTR/RRS, a 1-bit IDE, and a 1-bit XLF. This information transforms into a standard part Sn and an extended part Exn for an nth VCANn (e.g., Sa and Exa for VCAN_A. Sb and Exb for VCAN_B. Sc and Exb for VCAN_C, etc.). In one embodiment, Sn is a 12-bit value and Exn is a 20-bit value, although alternative data sizes are contemplated. The controller 720 initiates a slot timer 722 in response to assertion of the trigger command TRIG from the virtual engine 506 and waits for timer expiration to provide a time window during which any number of the VCANs of the network can provide first data upon which arbitration commences. Upon expiration of the slot timer 722, no more data is accepted for arbitration. The slot timer 722 may be implemented in any suitable manner, such as a counter or the like.

The standard part Sn and the corresponding extended part Exn from each VCAN involved in the arbitration are provided to first and second lowest value search engines 724 and 726, respectively, which outputs the lowest values Sl and Exl, respectively, of the values received. The lowest value sl is provided to a first input of each of a set of standard comparators 728, individually labeled Cn (e.g., Ca, Cb, Cc, etc.), in which each of the standard comparators 728 has a second input receiving a respective one of the standard parts Sn (e.g., Sa, Sb, Sc, etc.). Similarly, the lowest value Exl is provided to a first input of each of a set of extended comparators 730, also individually labeled Cn (e.g., Ca, Cb, Cc, etc.), in which each of the extended comparators 730 has a second input receiving a respective one of the extended parts Exn (e.g., Exa, Exb, Exc, etc.). Each of the comparators 728 and 730 provides a binary output based on results of the comparison.

The compare results at the outputs of the standard comparators 728 are provided to respective inputs of a pair match block 732, and to respective inputs of a set of match logic blocks 734, individually labeled Match Logic n (e.g., Match Logic a, Match Logic b, Match Logic c, etc.). The compare results at the outputs of the extended comparators 730 are also provided to respective inputs of the set of match logic blocks 734. Thus, for example, the outputs of the comparators Ca of each of the sets of comparator 728 and 730 are provided to respective inputs of Match Logic a, the outputs of the comparators Cb of each of the sets of comparator 728 and 730 are provided to respective inputs of Match Logic b, etc. The pair match block 732 has an output provided to respective inputs of each of the match logic blocks 734. The match logic blocks 734 output a set of local arbitration win (LAW) values LAWn including one LAW for each of the VCANs in the network that may participate in the local arbitration. It is noted that only one of the LAWn values is asserted indicating the winner of arbitration. The pair match logic 732 resolves the case of a match between two or more of the standard parts Sn. Two of the extended parts Exn may match but is significantly less likely. The match logic either predetermines a result in the event of a tie or does not indicate a winner in which arbitration may be lost for all VCAN candidates in that particular arbitration round.

An exemplary configuration of the Match Logic a is shown at 736, which illustrates one embodiment of each of the match logic blocks 734. The Match Logic 736 includes a pair of 2-input Boolean logic AND gates 740 and 742 and a 2-input Boolean logic OR gate 744. The AND gate 740 receives an inverted version of the output of the pair match block 732 and an output of a corresponding one of the standard comparators 728 (e.g., output of comparator Ca). The AND gate 742 receives the output of the pair match block 732 and an output of a corresponding one of the extended comparators 730 (e.g., output of comparator Ca). The outputs of the AND gates 740 and 742 are provided to respective inputs of the OR gate 744, which outputs LAWa. Each of the remaining ones of the match logic blocks 734 may be configured in substantially the same manner.

The local arbitration performed by the scalable arbiter 700 representing any of the scalable arbiters SA_1-SA_N is the only arbitration for virtual network types and is a first level of arbitration for physical network types. For physical network types, the linked protocol engine performs a second level of arbitration with an external physical CAN network referred to as line arbitration. A virtual CAN controller can transmit information via the external physical CAN network only by winning both first and second levels of arbitration, or otherwise transitions back to receive mode.

Upon power-up or reset (POR) of the VCAN device 300, the host system 302 communicates configuration information to the configuration & status module 320 to perform initialization. Initialization may include enabling of modules and corresponding networks, which may be done in any suitable sequence. In one embodiment, selected ones of the network interfaces 316 are enabled and initialized first, followed by initialization and enablement or disablement of the protocol engines 308, and then selected ones up to all of the VCANs 304 may be linked and initialized. Then the components may be enabled in the same order. Selected protocol engines 308 may first be enabled, in which the corresponding network interfaces 316 configure related settings of the linked protocol engine(s) according to a selected network plan. Exemplary settings may include, for example, baud rate, network timing, CAN type and corresponding settings, etc. The selected network interfaces 316 may then be initialized and enabled accordingly based on network type. The network types include physical and virtual. The network type is physical when linked to a protocol engine 308 for communicating with external physical CAN networks, such as, for example, NET1 and NET3 shown in FIG. 2. The network type is virtual when selected VCANs 304 are linked to one of the network interfaces 316 without being linked to any of the protocol engines 308, such as, for example, NET2 shown in FIG. 2. Various parameters of each of the selected network interfaces 316 are initialized based on network type. Selected ones of the VCANs 304 are linked to corresponding network interfaces 316, then initialized and enabled.

After initialization and enablement procedures are completed, the host system 302 executes the corresponding communication software or the like to begin CAN communications via the linked VCANs 304. The first step of each CAN transmission is local arbitration, such as performed by the scalable arbiter 700 shown and described in FIG. 7. Transmission frames from one or more of the VCANs 304 in the same network and having information to transmit are provided to the corresponding one of the scalable arbiters SA_1-SA_N via corresponding transmit buses as shown in FIG. 4. The corresponding scalable arbiter identifies the winning VCAN and the remaining losing VCANs in the same network are switched to receive mode.

For virtual CAN networks, the losing VCANs are converted to receive mode for receiving the transmission frame from the winning VCAN via the corresponding one of the network interfaces 316. The transmission frame of the winning VCAN is transmitted to the applicable one of the virtual engines VE_1-VE_N, which processes the data according to configured CAN bit timing and which then sends the transmitted information to the other linked VCANs in the same virtual network. The virtual engine may re-arrange the data in the proper format and generate controls to pop the data from the transmit buffer and push the data to the RX selectors of the participating VCANs.

For physical CAN networks, after the local arbitration, a second level line arbitration is performed via the corresponding external physical CAN network. The header of the VCAN that won local arbitration is transmitted to the corresponding one of the protocol engines 308 for external line arbitration on the corresponding external physical CAN network. As previously described, a lost arbitration indication is provided to the VCANs in the network that lost the local arbitration, and in response, the losing VCANs enter receive mode. Those VCANs in the same network not participating in the local arbitration may simply remain in receive mode. If the corresponding one of the protocol engines 308 wins the line arbitration, then the corresponding virtual engine sends an arbitration won indication to the VCAN that won the local arbitration, which may remain in transmit mode. If, however, the protocol engine loses line arbitration, then an arbitration lost indication is provided to the VCAN that won the local arbitration so that it also transitions to receive mode to receive any transmitted information from the external physical CAN network. The receive data and any errors identified by the corresponding protocol engine are broadcasted to the participating VCANs of the network. Each of the participating VCANs acts on the received information as per applicability according to its state and operating modes established by the host system 302. The corresponding virtual engine monitors network errors (usually errors on the CAN physical network) and acts to stop taking data from VCANs participating in the network.

Any of the VCANs 304 linked to a virtual or physical network can be switched to any other network as controlled by the host system 302. Such VCAN network switching from a first network to a second network may be performed gracefully at a frame boundary with minimal impact on performance to any other VCAN or network. The host system 302 selects the network for receiving the VCAN to be switched and updates corresponding configuration information in the configuration & status module 320 to notify the applicable network interfaces 316 of both the first and second networks. The host system 302 may initiate the update and notification to ensure smooth handling of network switching such as between frames (fence and drain). The corresponding network connection controllers NCC_1-NCC_N for the first and second networks monitor their corresponding VCANs into a freeze or idle mode or the like to facilitate switching. When the first network is in intermission or idle state after completion of transmission of a frame, the NCC of the first network modifies the state of the VCAN being switched (identified by configuration change) into an idle mode and broadcast an indication to the other NCCs. The NCC of the second network receiving the VCAN being switched receives the indication, waits for the correct network state, and then applies the configuration followed by modification of the mode of the VCAN being switched to normal mode from freeze mode. The NCC also sends an acknowledge and updates the status to the host system 302.

Operation is similar for simply adding an unused or spare VCAN 304 to any of the current networks. In this case, the host system 302 selects the VCAN to be added and updates corresponding configuration information in the configuration & status module 320 to notify the applicable network interface 316 of the receiving network. When the receiving network is in intermission or idle state after completion of transmission of a frame, the corresponding NCC updates its configuration information to include the VCAN being added. Once updated, the NCC also sends an acknowledge and updates the status to the host system 302. The host system 302 can the begin transmitting frames to the updated network via the added VCAN.

Any network may be switched from physical to virtual or vice-versa. To switch the network type, the host system 302 controls the VCI interfaces 312 of the VCANs participating in the network and then modifies the network type via the configuration & status module 320. The host system 302 changes the parameters of the protocol engine associated with the network to be modified and waits for the modified status to confirm the switching. When switching the type from physical to virtual, the host system 302 identifies a slot of intermission (e.g., frame boundary), throttles the corresponding transmission buffers of the corresponding VCI interfaces 312, disables the currently linked protocol engine, pushes updated configuration to the applicable virtual engine via the configuration & status module 320, and when acknowledged, re-enables the VCI interfaces 312 for further virtual CAN communications. When switching the type from virtual to physical, the host system 302 configures an available one of the protocol engines 308 identifies a slot of intermission (e.g., frame boundary), throttles the corresponding transmission buffers of the corresponding VCI interfaces 312, pushes updated configuration to the applicable virtual engine via the configuration & status module 320, and when acknowledged, re-enables the VCI interfaces 312 for further physical CAN communications.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive circuitry or negative circuitry may be used in various embodiments in which the present invention is not limited to specific circuitry polarities, device types or voltage or error levels or the like. For example, circuitry states, such as circuitry low and circuitry high may be reversed depending upon whether the pin or signal is implemented in positive or negative circuitry or the like. In some cases, the circuitry state may be programmable in which the circuitry state may be reversed for a given circuitry function.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A virtualized controller area network (CAN) system, comprising:
    a plurality of virtual CAN controllers; and
    a CAN virtual network controller, comprising:
        a plurality of virtual CAN interfaces, each coupled to a corresponding one of the plurality of virtual CAN controllers;
        a plurality of network interfaces, each configured to communicatively link one or more of the plurality of virtual CAN controllers; and
        a configuration controller that is configured to program any one or more of the network interfaces to communicatively link any one or more of the virtual CAN controllers;
    wherein each of the plurality of network interfaces comprises:
        a scalable arbiter that is configured to perform a local arbitration among linked ones of the plurality of virtual CAN controllers providing transmit information;
        a virtual engine that controls communication between linked ones of the plurality of virtual CAN controllers; and
        a network connection controller that can configure the scalable arbiter and the virtual engine based on programming information received from the configuration controller and that provides communication status information to the configuration controller.

2. The virtualized CAN system of claim 1, wherein each of the plurality of virtual CAN interfaces comprises a receive selector coupled to a receive bus of each of the plurality of network interfaces and a transmit buffer coupled to a transmit bus distributed to each of the plurality of network interfaces.

3. The virtualized CAN system of claim 1, wherein the configuration controller is configured to establish a virtual CAN network including selected ones of plurality of virtual CAN controllers communicatively linked together via one of the plurality of network interfaces.

4. The virtualized CAN system of claim 1, wherein the scalable arbiter is coupled to a transmit bus of each of the plurality of virtual CAN interfaces and wherein the virtual engine is coupled to a receive bus distributed to each of the plurality of virtual CAN interfaces.

5. The virtualized CAN system of claim 1, wherein the virtual engine comprises:
- a receive controller that is configured to control receive data flow for network communications including data format adaptation;
- a bit time generator that configures virtual network timing performed by the receive controller when configured for virtual networking; and
- a receive signal generator that is configured to translate received data based on configuration information from the receive controller and to provide translated data to a corresponding one of the plurality of virtual CAN interfaces via a corresponding receive bus.

6. The virtualized CAN system of claim 5, further comprising:
- a physical protocol engine coupled to the virtual engine and configured to communicatively interface a physical CAN network including providing received data to the receive signal generator;
- wherein the virtual engine further comprises a transmit controller that is configured to control transmit data flow between the scalable arbiter and the physical protocol engine including providing transmit status information;
- wherein the bit time generator configures virtual network timing performed by the transmit controller when configured for virtual networking; and
- wherein the network connection controller is configured to enable or disable the physical protocol engine based on the programming information received from the configuration controller.

7. The virtualized CAN system of claim 6, wherein the transmit controller is further configured to trigger the scalable arbiter for performing a local arbitration process between linked ones of the plurality of virtual CAN controllers.

8. The virtualized CAN system of claim 6, wherein the receive signal generator is further configured to multiplex signals between the physical protocol engine and the receive controller.

9. A virtualized controller area network (CAN) system, comprising:
- a plurality of virtual CAN controllers; and
- a CAN virtual network controller, comprising:
  - a plurality of virtual CAN interfaces, each coupled to a corresponding one of the plurality of virtual CAN controllers;
  - a plurality of network interfaces, each configured to communicatively link one or more of the plurality of virtual CAN controllers; and
  - a configuration controller that is configured to program any one or more of the network interfaces to communicatively link any one or more of the virtual CAN controllers;
- at least one physical protocol engine, each communicatively linked to a corresponding one of the plurality of network interfaces, and each configured to communicatively interface a physical CAN network; and
- wherein the configuration controller is configured to provide programming information to enable a physical protocol engine for configuring a physical CAN network or to disable the physical protocol engine for configuring a virtual CAN network.

10. The virtualized CAN system of claim 9, wherein each of the plurality of network interfaces is configured to perform a first level of arbitration between linked ones of the plurality of virtual CAN controllers and to pass transmit information of a winning virtual CAN controller to a linked physical protocol engine which is configured to perform a second level of arbitration on a physical CAN network.

11. The virtualized CAN system of claim 9, wherein the configuration controller is configured to establish a physical CAN network including selected ones of plurality of virtual CAN controllers communicatively coupled to a physical protocol engine via a corresponding one of the plurality of network interfaces.

12. The virtualized CAN system of claim 9, wherein a total number of the at least one physical protocol engine is limited to a total number of external physical CAN networks.

13. The virtualized CAN system of claim 9, further comprising a host system that is configured to perform CAN communications with any of the plurality of virtual CAN controllers.

14. The virtualized CAN system of claim 13, wherein the host system controls the configuration controller to group the plurality of virtual CAN controllers into a plurality of CAN groups in which each of the plurality of CAN groups is associated with a corresponding one of a plurality of application control modules.

15. The virtualized CAN system of claim 14, further comprising:
- at least one physical protocol engine, each communicatively linked to a corresponding one of the plurality of network interfaces, and each configured to communicatively interface a physical CAN network; and
- wherein the configuration controller is configured to provide programming information to enable a physical protocol engine for configuring a physical CAN network or to disable the physical protocol engine for configuring a virtual CAN network.

16. The virtualized CAN system of claim 15, wherein a first application control module includes a first number of virtual CAN controllers communicatively linked with a first physical protocol engine in a first physical CAN network, and further includes a second number of virtual CAN controllers communicatively linked with a second physical protocol engine in a second physical CAN network.

17. The virtualized CAN system of claim 15, wherein a first application control module includes a first number of virtual CAN controllers communicatively linked with a physical protocol engine in a first physical CAN network, and further includes a second number of virtual CAN controllers communicatively linked in a virtual CAN network with at least one other virtual CAN controller.

18. The virtualized CAN system of claim 9, wherein the configuration controller is configured to dynamically remove a virtual CAN controller from a CAN network.

19. The virtualized CAN system of claim 9, wherein the configuration controller is configured to dynamically link a virtual CAN controller to a CAN network.

* * * * *